United States Patent
Watson et al.

(10) Patent No.: US 12,412,011 B2
(45) Date of Patent: Sep. 9, 2025

(54) METHOD FOR THREE-DIMENSIONAL TORTUOUS PATH FLOW ELEMENT

(71) Applicant: Control Components, Inc., Rancho Santa Margarita, CA (US)

(72) Inventors: Dan Watson, Rancho Santa Margarita, CA (US); Uzair Ahmed, Rancho Santa Margarita, CA (US); Raymond R. Newton, Rancho Santa Margarita, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 484 days.

(21) Appl. No.: 17/142,522

(22) Filed: Jan. 6, 2021

(65) Prior Publication Data

US 2021/0209276 A1 Jul. 8, 2021

Related U.S. Application Data

(60) Provisional application No. 62/958,494, filed on Jan. 8, 2020.

(51) Int. Cl.
*G06F 30/28* (2020.01)

(52) U.S. Cl.
CPC .................. *G06F 30/28* (2020.01)

(58) Field of Classification Search
CPC .......... G06F 30/28; G06F 30/00; G06F 30/10; G06F 30/12; G06F 2111/00–2119/22;
(Continued)

(56) References Cited

U.S. PATENT DOCUMENTS

| 3,191,906 A | * | 6/1965 | Zeigler | F16K 1/222 251/304 |
| 5,983,985 A | * | 11/1999 | Counterman | B21D 13/04 165/8 |

(Continued)

FOREIGN PATENT DOCUMENTS

| CN | 108056850 | 5/2018 |
| EP | 3373168 A1 | 9/2018 |
| WO | 2008033127 A1 | 3/2008 |

OTHER PUBLICATIONS

Stewart, Nigel Timothy "An Image-Space Algorithm for Hardware-Based Rendering of Constructive Solid Geometry", May 2008 (Year: 2008).*

(Continued)

*Primary Examiner* — Rehana Perveen
*Assistant Examiner* — Troy A Maust
(74) *Attorney, Agent, or Firm* — Stetina Garred Brucker & Newboles (57) ABSTRACT

A method of designing a three-dimensional flow control element includes creating a first computer aided design representative of a flow configuration having a first end and a second end. A second computer aided design of a host body is created. The design of the flow configuration is digitally inserted into the design of the host body such that the two designs define an overlapping region. The first computer aided design and the portion of the second computer aided design in the overlapping region is subtracted from a remainder of the second computer aided design to produce a third computer aided design of a flow control element having a fluid pathway extending therethrough. The fluid pathway is associated with the overlapping portions of the first and second computer aided designs.

12 Claims, 7 Drawing Sheets

(58) Field of Classification Search
CPC .......... G06F 30/17; Y02T 50/10; F04B 53/16; F04B 53/1002; F04B 53/10; F04B 39/1006; F16K 1/36; G06T 17/10
See application file for complete search history.

(56) References Cited

U.S. PATENT DOCUMENTS

| | | | |
|---|---|---|---|
| 7,155,375 | B1 | 12/2006 | Rimoldi et al. |
| 7,802,592 | B2* | 9/2010 | McCarty ................. F16K 47/08 137/625.3 |
| 7,857,050 | B2 | 12/2010 | Zazovsky et al. |
| 8,723,861 | B1 | 5/2014 | Strater et al. |
| 10,401,876 | B1* | 9/2019 | Coleman .................. G05D 7/00 |
| 2007/0240774 | A1* | 10/2007 | McCarty ................. F16K 47/08 137/625.37 |
| 2007/0272408 | A1* | 11/2007 | Zazovsky ............... E21B 43/12 166/227 |
| 2012/0236028 | A1 | 9/2012 | Desimone et al. |
| 2013/0046511 | A1 | 2/2013 | Tayal et al. |
| 2014/0060789 | A1* | 3/2014 | Rousseau ................ F28F 3/025 165/166 |
| 2016/0055267 | A1 | 2/2016 | Tomono et al. |
| 2016/0102781 | A1 | 4/2016 | Glaun |
| 2018/0173815 | A1 | 6/2018 | Stiles et al. |
| 2018/0283580 | A1 | 10/2018 | Andreas et al. |
| 2018/0340643 | A1* | 11/2018 | Gabriel ............. F16L 55/02781 |
| 2020/0250894 | A1 | 8/2020 | Mehr et al. |
| 2022/0381234 | A1* | 12/2022 | Son ........................ F04B 53/16 |

OTHER PUBLICATIONS

"Solidworks Help: Combining Bodies—Subtract" captured on Apr. 12, 2016 by the Wayback Machine, retreived Mar. 8, 2024 from https://web.archive.org/web/20160512223806/http://help.solidworks.com:80/2015/english/solidworks/sldworks/t_combining_bodies_subtract.htm (Year: 2016).*
India First Examination Report for Indian Patent Application No. 202247042838; mailed Aug. 18, 2022.
International Search Report and Written Opinion for PCT/US2021/012490; mailed Mar. 23, 2021.
Office Action for Korean Patent Application No. 10-2022-7026897; mailed Jan. 8, 2024.
Extended European Search Report for EP Application No. 21 73 8972; mailed Mar. 25, 2024.
"Modeling of Multi-Connected, Porous Passageway for Mould Cooling," K. M et al.; Feb. 12, 2011.
Office Action for Korean Patent Application No. 10-2022-7026897; mailed Oct. 10, 2024.

* cited by examiner

METHOD FOR THREE-DIMENSIONAL TORTUOUS PATH FLOW ELEMENT

CROSS-REFERENCE TO RELATED APPLICATIONS

The present application claims priority to U.S. Provisional Application Ser. No. 62/958,494, filed Jan. 8, 2020, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to the design of a flow control element, and more specifically to the computer aided design of the flow control element having a plurality of flow control passageways formed therein, wherein the design methodology results in quicker design times and reduced computational requirements for designing the flow control element.

2. Description of the Related Art

Multi-stage trim in control valves are commonly used to facilitate pressure drops in fluid flowing through the control valve. A typical multi-stage trim may include a flow control element having tortuous path trim designs formed therein, such that as fluid flow through the tortuous paths, the pressure of the fluid may drop.

Conventional design methods for tortuous path trims have been created in computer aided design (CAD) systems using two-dimensional design methods. A designer may create a plate with a nominal diameter and thickness and a two-dimensional path may be generated on an upper surface of the plate. The path may then be digitally extruded or cut into the plate to a prescribed depth. The flow path extrusion may be reproduced and arrayed around the plate to complete the plate design.

It is understood that the flow control element may include plates having distinctive flow paths formed therein, and thus, the process may be repeated for each unique plate included in the flow control element. Once all of the plates are created, the final step in the conventional design method may be to stack the plates and then unitize the plates in the CAD system to generate the resultant flow control element.

Although the above-described conventional two-dimensional design method may allow for successful design of a flow control element, such conventional design methodologies are commonly associated with several deficiencies. In particular, the flow paths in the flow control element may not be easily organized into three dimensional arrangements within the flow element. Furthermore, the computer-aided design process associated with conventional two-dimensional modeling may require repetition for different plate sizes, or if the flow direction of the flow path needs to be reversed.

In addition to conventional two-dimensional modelling methods, three-dimensional methods have also been used to design flow control elements. Existing three-dimensional methods are typically indirect methods, wherein the solid physical geometry of the flow control element is explicitly defined, which results in hollow voids being indirectly defined, and which act as multi-stage tortuous flow paths within the solid design.

Similar to conventional two-dimensional design methods, the existing three-dimensional methods may also be associated with certain drawbacks. One of the most significant drawbacks associated with existing three-dimensional modeling methods is that a critical portion of the flow control element, i.e., the flow path, is not directly defined. As such, it may be very difficult to fine-tune, change, or standardize the flow control element. These difficulties may also cause a strain on the computer system being used to design the three-dimensional model. Furthermore, it may be difficult to understand the true nature of the flow path, as the shapes may be irregular. Due to the indirect nature of the flow path, there may also be challenges when creating calculations and sizing tools.

Accordingly, there is a need in the art for an improved method of forming three-dimensional flow control elements, which may allow for faster design, reduced computing requirements, and enhanced design flexibility. Various aspects of the present disclosure address this particular need, as will be discussed in more detail below.

BRIEF SUMMARY

Various aspects of the present disclosure are directed toward three-dimensional design methodologies for creating a flow control element having several flow paths formed therein. The design methods may include creating a first design representative of the flow path as a solid element and separate from the body of the flow control element. The solid configuration of the flow path is then inserted and reproduced within the body of the flow control element. The solid configuration of the flow path is then subtracted from the body to create the resultant flow paths within the flow control element. By creating the flow path as a solid structure, the requirements of the associated computer may be mitigated, which may allow for faster and more flexible designs.

In accordance with one embodiment of the present disclosure, there is provided a method of designing a three-dimensional flow control element. The method includes creating a first computer aided design representative of a flow configuration having a first end and a second end. The method additionally includes creating a second computer aided design of a host body having an inner surface and an outer surface. The first computer aided design of the flow configuration is digitally inserted into the second computer aided design of the host body such that the first and second computer aided designs define an overlapping region. The first computer aided design is inserted into the second computer aided design such that the flow configuration extends through the host body to traverse both the inner surface and the outer surface. The method additionally includes subtracting the first computer aided design and the portion of the second computer aided design in the overlapping region from a remainder of the second computer aided design to produce a third computer aided design of a flow control element having a fluid pathway extending therethrough. The fluid pathway is associated with the overlapping portions of the first and second computer aided designs.

The method may additionally include reproducing the first computer aided design to generate a plurality of first computer aided designs. The plurality of first computer aided designs may be digitally inserted into the second computer aided design such that the plurality of first computer aided designs and the second computer aided designs define a plurality of overlapping regions. Each of the plurality of first computer aided designs may be inserted into the second computer aided design such that the flow configuration associated with each first computer aided design extends through the host body to traverse both the inner surface and the outer surface.

The plurality of first computer aided designs may be digitally inserted into the second computer aided design in accordance with a prescribed arrangement. The prescribed arrangement may be a helical arrangement wherein adjacent ones of the plurality of first computer aided designs form a helical pattern. The prescribed arrangement may also be a planar arrangement wherein adjacent ones of the plurality of first computer aided designs lie in a common plane.

The flow configuration associated with the first computer aided design may extend along at least two axes.

The flow configuration associated with the first computer aided design may include a beveled section.

The first computer aided design may be created independent of the second computer aided design.

The first end and a second end of the flow configuration may define a flow path length as the linear distance between the first and second ends. The first and second computer aided designs being created such that the flow path length is greater than a distance between the inner surface and outer surface of the host body.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments related to a flow control element and related methods of forming the same, and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure relate to methodologies for designing three-dimensional tortuous path trim elements, wherein the flow path is initially created as a solid element which is overlapped with the body of the flow control element, and then subsequently subtracted therefrom to create the flow paths. By creating the flow path initially as a solid element, the strain on computing resources may be mitigated, which may result in much faster design times, and allow for a greater degree of design flexibility.

Figure 1:
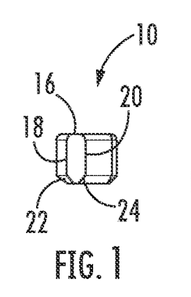
FIG. 1 is cross sectional view of a computer aided design of a flow path configuration for use in a flow control element.
Figure 2:
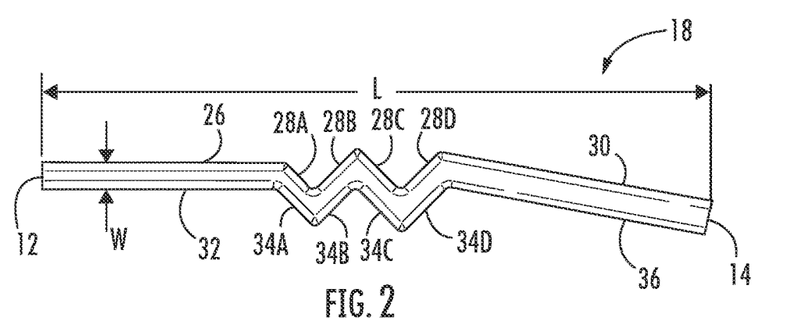
FIG. 2 is a top view of the flow path configuration depicted in FIG. 1.

Referring now specifically to FIGS. 1 and 2, the method may include creating a first computer aided design 10 representative of a flow configuration of a flow path desired for the resultant flow control element. The flow configuration associated with each first computer aided design 10 may facilitate attainment of desired fluid characteristics of fluid flowing through the corresponding flow path. The first computer aided design 10 may be created using conventional computer aided design software known in the art and may be created as a solid element which includes a first end 12 and a second end 14 to define a length L therebetween. The flow configuration associated with the first computer aided design 10 may include several turns so as to extend along at least two axes, as will be described in more detail below.

According to one embodiment, each first computer aided design 10 includes a transverse (top) surface 16, a pair of side surfaces 18, 20 and a pair of beveled surfaces 22, 24. The transverse surface 16 may be generally planar and perpendicular to the side surfaces 18, 20. The pair of side surfaces 18, 20 may both extend from the transverse surface 16 in generally opposed relation to each other. In one embodiment, the side surfaces 18, 20 are similar in confirmation and generally parallel to each other. The side surfaces 18, 20 may define a width, W, of the first computer aided design 10 as the distance between the side surfaces 18, 20 in a direction perpendicular to both side surfaces 18, 20. The width W of the first computer aided design 10 may vary along the first computer aided design 10 so as to include a narrow portion and a wide portion. In the exemplary embodiment depicted in FIG. 2, the width W increases from the first end 12 to the second end 14 to control fluid expansion. However, it is also contemplated that in alternate embodiments, the width W may increase from the second end 14 to the first end 12.

In addition to variations in width W of the computer aided design 10, it is contemplated that variations in height of the computer aided design 10 may also be incorporated therein to facilitate desired fluid characteristics. The height of the computer aided design 10 may be refer to a dimension that is perpendicular to the width W. From the perspective shown in FIG. 1, the height may refer to the distance between the transverse surface 16 and the apex opposite the transverse surface 16 defined by the beveled surfaces 22, 24. The height of the computer aided design 10 may vary along the computer aided design 10 so as to include a low portion and a tall portion to facilitate desired fluid characteristics. For instance, the height may increase from the first end 12 to the second end 14, or alternatively, from the second end 14 to the first end 12.

Referring now specifically to FIG. 2, the first side surface 18 includes an inner linear segment 26, a plurality of angled segments 28A-D and an outer linear segment 30. The angled segments 28A-D may define one or more apexes and valleys. Each apex and each valley may be defined by an adjacent pair of angled segments 28A-D.

The second side surface 20 is similar to the first side surface 18. In particular, the second side surface 20 includes an inner linear segment 32, a plurality of angled segments 34A-D, and an outer linear segment 36. The angled segments 34A-D may define one or more apexes and valleys. Each apex and each valley may be defined by an adjacent pair of angled segments 34A-D.

The valleys formed on the first side surface 18 may reside on a common axis, along with the apex formed on the second side surface 20, which may prevent linear fluid flow through the middle of the flow configuration. Thus, the entirety of the fluid flowing through the flow configuration may be forced to change course as it flows through the tortuous configuration, thereby facilitating desired pressure drop in the fluid.

The beveled surfaces 22, 24 may extend from respective side surfaces 18, 20. The beveled surfaces 22, 24 extend toward each other to define a peak at the intersection of the beveled surfaces 22, 24. The shape and arrangement of the beveled surfaces 22, 24 may assist in providing strength and structural integrity to the flow configuration, especially during the process of manufacturing of the flow control element 10. Furthermore, the beveled surfaces 22, 24 may provide structure support to overlying flow configurations in the flow control element 10.

Figure 3:
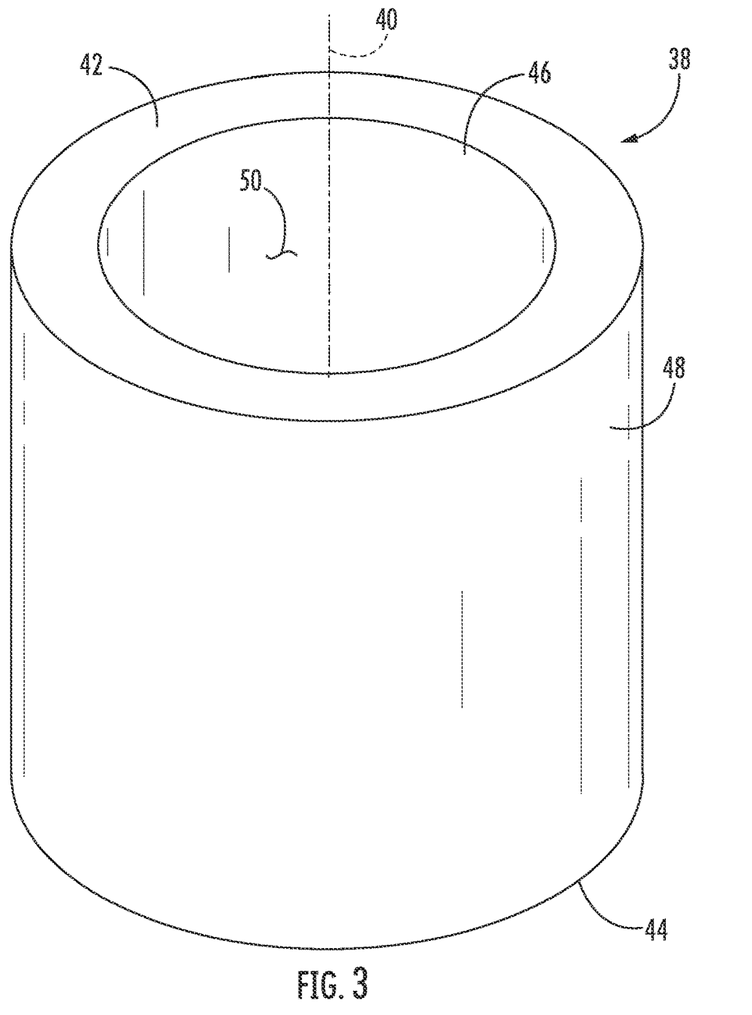
FIG. 3 is an upper perspective view of a computer aided design of a host body used to design the flow control element.

Referring now to FIG. 3, the method additionally includes creating a second computer aided design 38 of a host body. According to one embodiment the host body may be a generally annular structure disposed about a body axis 40 and include a first (top) surface 42 and an opposing second (bottom) surface 44. The host body additionally includes an inner surface 46 and an outer surface 48 both of which extend between the first and second surfaces 42, 44, with the inner surface 46 defining a central bore 50 extending along the body axis 40.

The design and creation of the first and second computer aided designs 10, 38 may be done separate and independent of each other. In other words, the first and second computer aided design 10, 38 may not be designed in combination with each other.

Figure 4:
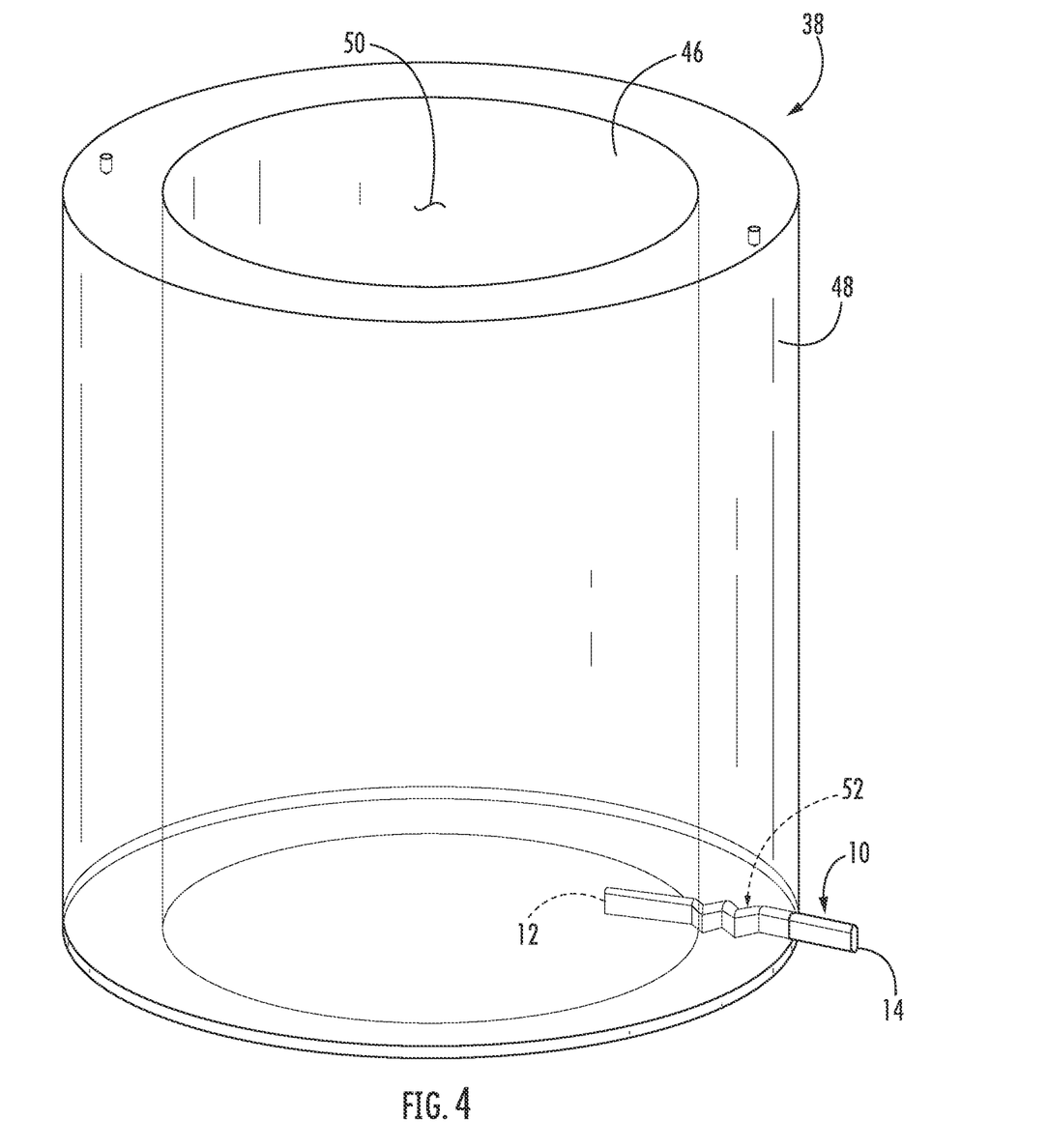
FIG. 4 is an upper perspective view of the flow path configuration of FIGS. 1-2 inserted into the host body of FIG. 3.
Figure 5:
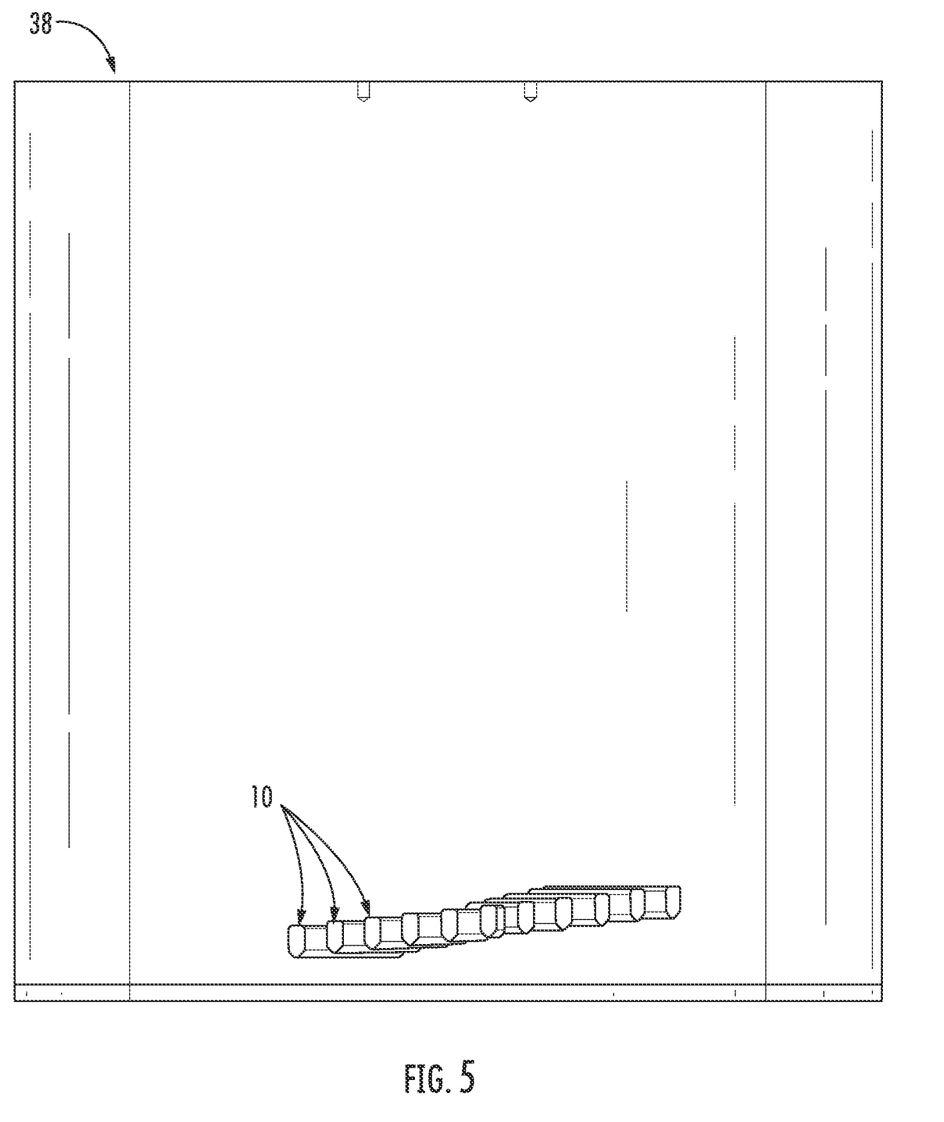
FIG. 5 is a side view of the flow path configuration being replicated in a helical configuration relative to the host body.
Figure 6:
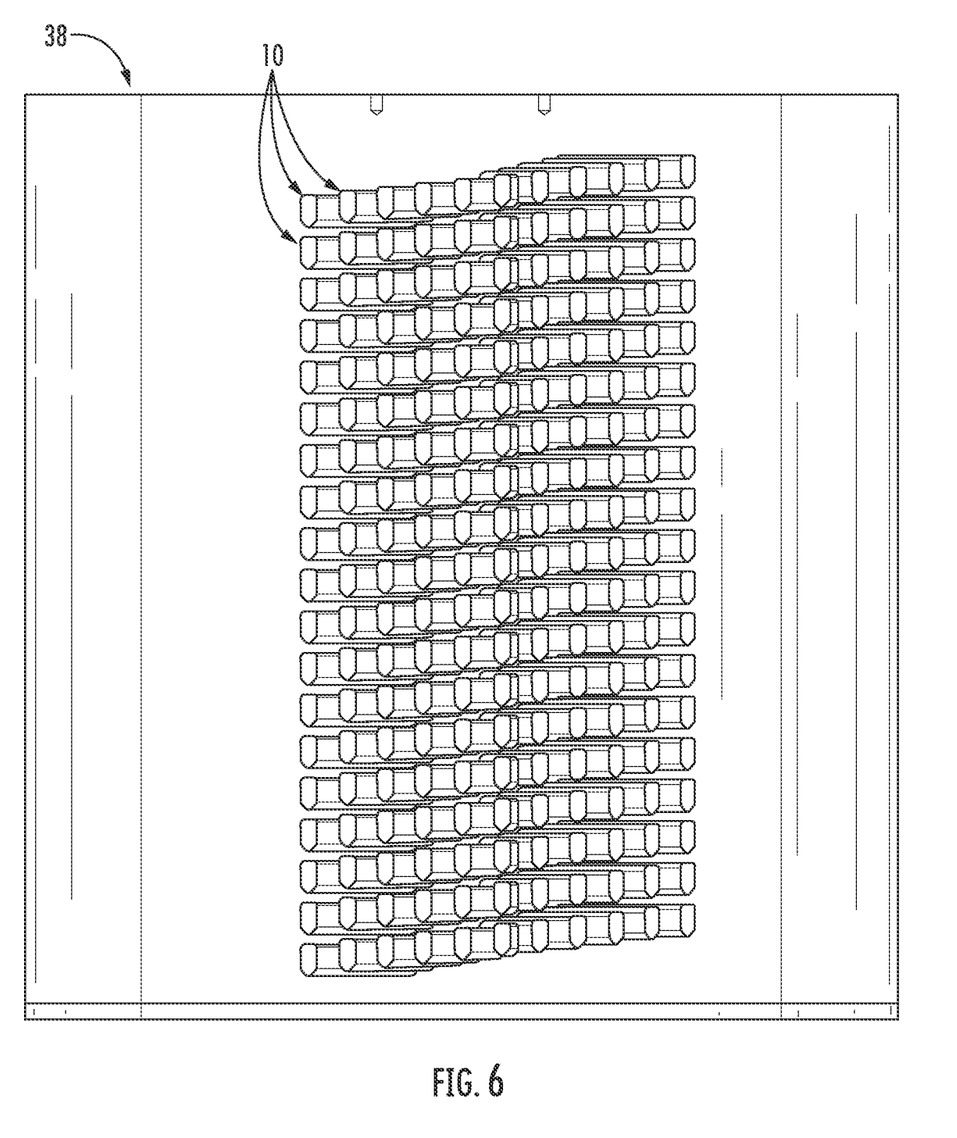
FIG. 6-7 are a side views of the flow path configurations being further replicated in arrays relative to the host body.
Figure 7:
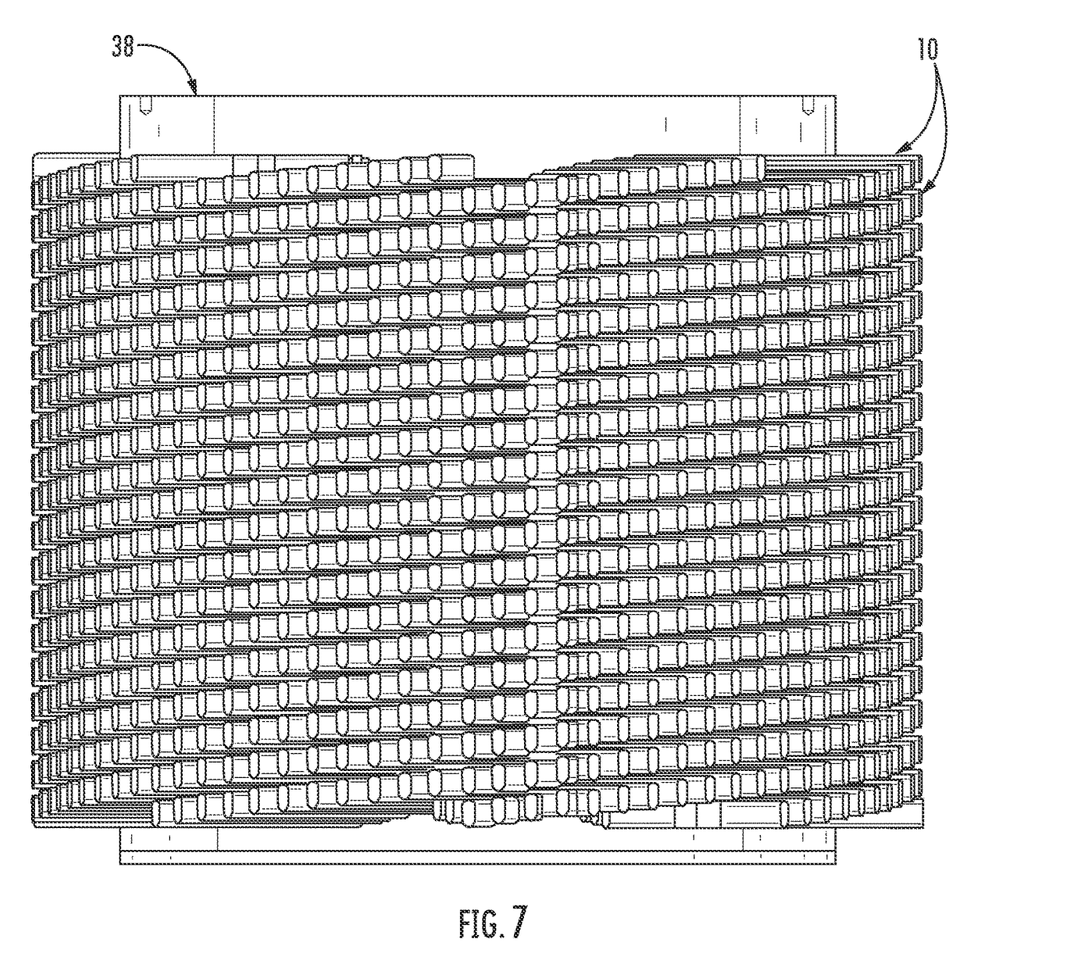
Figure 8:
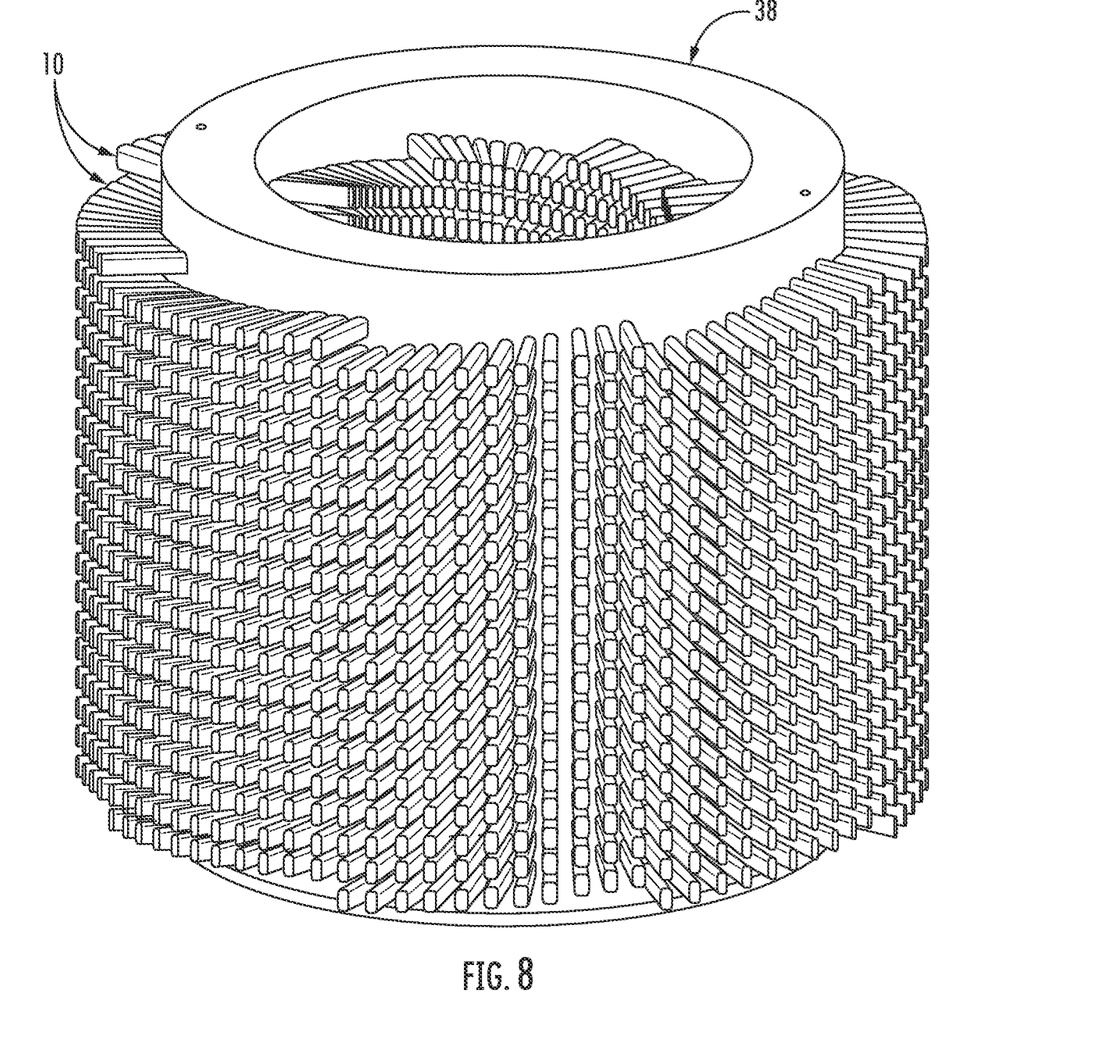
FIG. 8 is an upper perspective view of the flow path configurations having been completely replicated relative to the host body.

With both of the first and second computer aided designs 10, 38 having been created, and referring now specifically to FIG. 4, the first computer aided design 10 of the flow configuration is digitally inserted into the second computer aided design 38 of the host body such that the first and second computer aided designs 10, 38 define an overlapping region 52. In particular, the first computer aided design 10 is inserted into the second computer aided design 38 such that the flow configuration extends through the host body to traverse both the inner surface 46 and the outer surface 48. The size and configuration of the first and second computer aided designs 10, 38 may be such that the flow path length L is greater than a distance between the inner surface 46 and outer surface 48 of the host body. Therefore, when the first computer aided design 10 is inserted or combined with the second computer aided design 38, the first end 12 of the computer aided design 10 may be located within the central bore 50 of the host body, while the second end 14 is positioned outside of the host body.

Referring now specifically to FIGS. 5-8, the first computer aided design 10 may be reproduced to generate a plurality of first computer aided designs 10. The plurality of first computer aided designs 10 may be digitally inserted into the second computer aided design 38 such that the plurality of first computer aided designs 10 and the second computer aided designs 38 define a plurality of overlapping regions 52. Each of the plurality of first computer aided designs 10 may be inserted into the second computer aided design 38 such that the flow configuration associated with each first computer aided design 10 extends through the host body to traverse both the inner surface 46 and the outer surface 48.

The plurality of first computer aided designs 10 may be digitally inserted into the second computer aided design 38 in accordance with a prescribed arrangement. The prescribed arrangement may be a helical arrangement wherein adjacent ones of the plurality of first computer aided designs 10 form a helical pattern. In this regard, a plurality of first computer aided designs 10 may lie along a helix extending over the host body. It is contemplated that the plurality of first computer aided designs 10 may lie along several helixes relative to the host body.

It is also contemplated that the prescribed arrangement may also be a planar arrangement wherein adjacent ones of the plurality of first computer aided designs 10 lie in a common plane (e.g., horizontal plane or vertical plane). The prescribed arrangement may also result in prescribed spacing between adjacent first computer aided designs 10. In some embodiments, the spacing between be equal, while in other embodiments, there may be prescribed offsets at certain locations, e.g., vertical offsets after a certain number of horizontal rows, etc. Any arrangement of the first computer aided designs 10 may be adopted to achieve desired flow characteristics.

Figure 9:
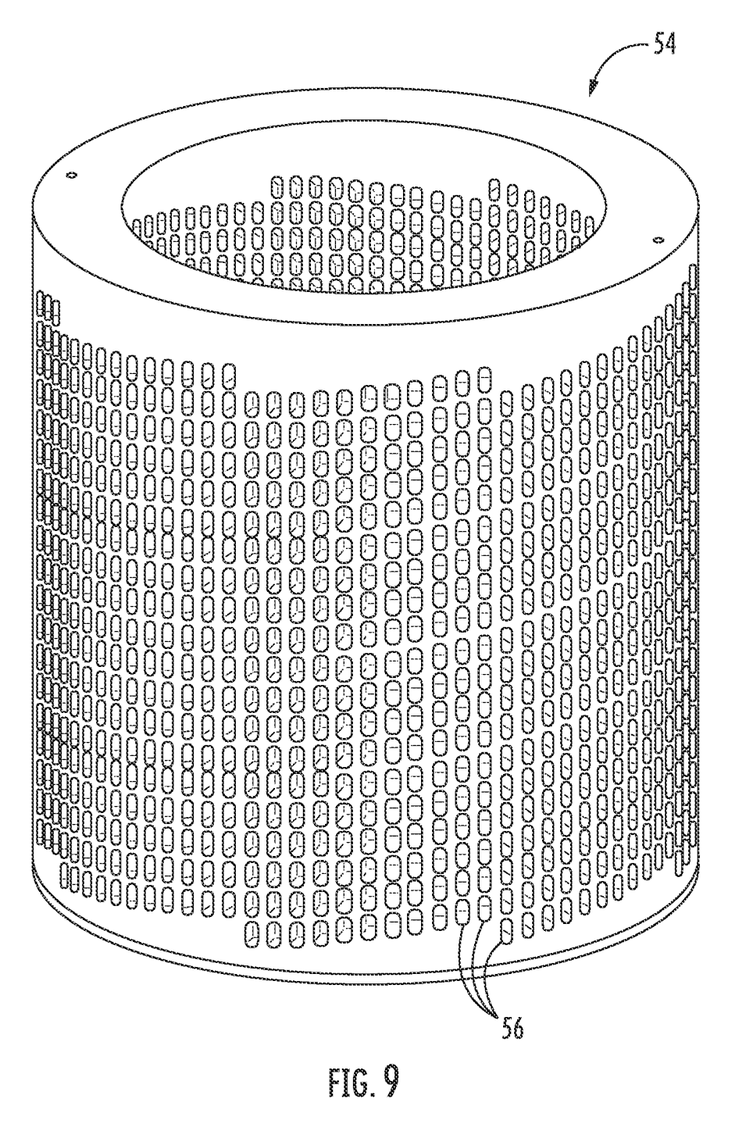
FIG. 9 is an upper perspective view of the flow control element created by removing the flow path configurations and any portion of the host body overlapping with the flow path configurations to create a plurality of flow passages in the flow control element.

Once all of the first computer aided designs 10 are created and inserted into the second computer aided design 10, the resultant flow control element may be created by subtracting the first computer aided designs 10 and the overlapping regions 52 of the second computer aided design 38 from the remainder of the second computer aided design 38. The resultant design may be a third computer aided design 54 of the flow control element having one or more fluid pathways 56 extending therethrough, with each fluid pathway 56 being associated with a respective overlapping region 52.

The resultant third computer aided design 54 may be transmitted to a manufacturing tool (e.g., three-dimensional printer) or facility to manufacture or build the associated flow control element.

Various aspects of the above-described method of designing a flow control element are associated with significant improvements to the computer systems used to create the computer aided designs. In particular, the design methodology may allow for faster design times and greater flexibility in the designs themselves, as well as arranging the first computer aided designs 10 within, or relative to, the second computer aided design 38. These benefits may be attributable to the separate creation of the first and second computer aided designs 10, 38, particularly with the first computer aided design 10 being designed as a solid structure.

It is contemplated that the design methodologies disclosed herein may be applied to many globe style control valves with cylindrical flow elements and radial or axial flow paths, as well as flow elements for rotary valves including control ball valves, or pipeline and vent resistors.

The particulars shown herein are by way of example only for purposes of illustrative discussion and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method of designing a three-dimensional flow control element, the method comprising the steps of:
   creating a plurality of first computer aided designs, each being representative of a fixed flow configuration having a first end, a second end fixed relative to the first end, at least one bend between the first end and the second end, and a pair of beveled surfaces intersecting to define an apex extending longitudinally along the fixed flow configuration from the first end to the second end such that the apex extends continuously along the at least one bend;
   creating a second computer aided design of a host body having an inner surface and an outer surface, the inner surface defining a central bore;
   digitally inserting the plurality of first computer aided designs of the fixed flow configuration into the second computer aided design of the host body such that the first and second computer aided designs define a plurality of overlapping regions representative of a plurality of arrays, each array being defined by a respective group of the plurality of first computer aided designs, each of the plurality of first computer aided designs within a given group being aligned along a first axis, the plurality of arrays being axially offset from each other with the first ends of the first computer aided designs in adjacent arrays defining a degree of overlap along a second axis perpendicular to the arrays, the plurality of first computer aided designs forming a helical arrangement wherein adjacent ones of the plurality of first computer aided designs form a helical pattern, each first computer aided design being inserted into the second computer aided design such that the fixed flow configuration extends through the host body to traverse both the inner surface and the outer surface, with at least one of the first end and the second end of the fixedflow configuration overlapping with the central bore; and
   subtracting the plurality of first computer aided designs and portions of the second computer aided design in the overlapping regions from a remainder of the second computer aided design to produce a third computer aided design of a flow control element having a plurality of fluid pathways extending therethrough, the plurality of fluid pathways being associated with the overlapping regions of the first and second computer aided designs.

2. The method of claim 1, wherein the plurality of first computer aided designs are inserted into the second computer aided design in accordance with a prescribed arrangement.

3. The method of claim 1, wherein the fixed flow configuration associated with the first computer aided design extends along at least two axes.

4. The method of claim 1, wherein the first computer aided design is created independent of the second computer aided design.

5. The method of claim 1, wherein:
   the first end and the second end of the fixed flow configuration defines a flow path length as the linear distance between the first and second ends;
   the first and second computer aided designs being created such that the flow path length is greater than a distance between the inner surface and outer surface of the host body.

6. A method of designing a three-dimensional flow control element, the method comprising the steps of:
   digitally inserting a plurality of first computer aided designs, each being of a fixed flow configuration having a first end, a second end fixed relative to the first end, and a pair of beveled surfaces intersecting to define an apex extending longitudinally along the fixed flow configuration from the first end to the second end and continuously along at least one bend in the fixed flow configuration, into a second computer aided design of a host body such that the first and second computer aided designs define a plurality of overlapping regions representative of a plurality of arrays, each array being defined by a respective group of the plurality of first computer aided designs, each of the plurality of first computer aided designs within a given group being aligned along a first axis, the plurality of arrays being axially offset from each other with the first ends of the first computer aided designs in adjacent arrays defining a degree of overlap along a second axis perpendicular to the arrays, the plurality of first computer aided designs forming a helical arrangement wherein adjacent ones of the plurality of first computer aided designs form a helical pattern, each first computer aided design being inserted into the second computer aided design such that the fixed flow configuration extends through the host body to traverse both an inner surface and an outer surface of the host body, with at least one of the first end and the second end of the fixed flow configuration overlapping with a central bore defined by the inner surface of the host body; and
   subtracting the first computer aided designs and portions of the second computer aided design in the overlapping regions from a remainder of the second computer aided design to produce a third computer aided design of a flow control element having a fluid pathway extending therethrough, the fluid pathway being associated with the overlapping regions of the first and second computer aided designs.

7. The method of claim 6, wherein the plurality of first computer aided designs are inserted into the second computer aided design in accordance with a prescribed arrangement.

8. The method of claim 6, wherein the flow configuration associated with the first computer aided design extends along at least two axes.

9. The method of claim 6, wherein the first computer aided design is created independent of the second computer aided design.

10. The method of claim 6, wherein:
    the first end and a second end of the flow configuration defines a flow path length as the linear distance between the first and second ends;

the first and second computer aided designs being created such that the flow path length is greater than a distance between the inner surface and outer surface of the host body.

11. A three-dimensional flow control element formed by the process of claim 6.

12. A method of designing a three-dimensional flow control element, the method comprising the steps of:

digitally inserting a plurality of first computer aided designs, each of a fixed flow configuration having a first end and a second end fixed relative to the first end, into a second computer aided design of a host body such that the plurality of first computer aided designs and the second computer aided design define a plurality of overlapping regions, the plurality of first computer aided designs being inserted into the second computer aided design to form a plurality of arrays, each array being defined by a respective group of the plurality of the first computer aided designs, each of the plurality of first computer aided designs within a given group being aligned along a first axis, the plurality of arrays being axially offset from each other with the first ends of the first computer aided designs in adjacent arrays defining a degree of overlap along a second axis perpendicular to the array, the plurality of first computer aided design forming a helical arrangement wherein adjacent ones of the plurality of first computer aided designs form a helical pattern, and such that the fixed flow configuration associated with each of the plurality of first computer aided designs extends through the host body to traverse both an inner surface and an outer surface of the host body, with at least one of the first end and the second end of the fixed flow configuration overlapping with a central bore defined by the inner surface of the host body; and subtracting each of the plurality of first computer aided designs and portions of the second computer aided design in the plurality of overlapping regions from a remainder of the second computer aided design to produce a third computer aided design of a flow control element having a plurality of fluid pathways extending therethrough, the plurality of fluid pathways being associated with the plurality of overlapping regions.

* * * * *